(12) United States Patent
Longhi

(10) Patent No.: US 11,759,844 B2
(45) Date of Patent: Sep. 19, 2023

(54) METHOD AND PLANT FOR THE PRODUCTION OF A RIM FOR A WHEEL OF A VEHICLE

(71) Applicant: FERRARI S.p.A., Modena (IT)

(72) Inventor: Daniel Longhi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/831,497

(22) Filed: Jun. 3, 2022

(65) Prior Publication Data

US 2022/0395891 A1     Dec. 15, 2022

(30) Foreign Application Priority Data

Jun. 10, 2021   (IT) .................. 102021000015200

(51) Int. Cl.
| | |
|---|---|
| *B21H 1/10* | (2006.01) |
| *B33Y 30/00* | (2015.01) |
| *B22F 10/20* | (2021.01) |
| *B33Y 80/00* | (2015.01) |
| *B60B 3/06* | (2006.01) |
| *B33Y 70/00* | (2020.01) |

(52) U.S. Cl.
CPC ............... *B21H 1/10* (2013.01); *B22F 10/20* (2021.01); *B33Y 30/00* (2014.12); *B33Y 80/00* (2014.12); *B60B 3/06* (2013.01); *B33Y 70/00* (2014.12)

(58) Field of Classification Search
CPC .................................. B21J 5/12; B21D 53/30
See application file for complete search history.

(56) References Cited

U.S. PATENT DOCUMENTS

| | | | |
|---|---|---|---|
| 10,882,104 B2 | 1/2021 | Gao et al. | |
| 11,046,110 B2* | 6/2021 | Di Serio | .............. B23K 20/122 |
| 2022/0105746 A1* | 4/2022 | Von Czarnowski | .... B60B 1/042 |

FOREIGN PATENT DOCUMENTS

| | | |
|---|---|---|
| DE | 102016005646 A1 | 12/2016 |
| WO | 2017191497 A1 | 11/2017 |
| WO | 2019238278 A1 | 12/2019 |
| WO | WO-2021154340 A1 * | 8/2021 |

OTHER PUBLICATIONS

What Is Flow Forming Technology [online]. Konig Corporation, Jun. 11, 2017 [retrieved on Dec. 22, 2022]. Retrieved from the Internet: <URL: https://web.archive.org/web/20170611062553/https://konigwheels.com/wheel-info-tech/what-is-flow-forming-technology/>. (Year: 2017).*

Search Report for Italian Application No. 02021000015200, completed Feb. 22, 2022, 9 pages.

* cited by examiner

*Primary Examiner* — Jacob J Cigna
(74) *Attorney, Agent, or Firm* — CANTOR COLBURN LLP

(57) ABSTRACT

A method and a plant for the production of a rim for a wheel of a vehicle. At first and by means of an additive manufacturing process, a temporary rim is manufactured, which is provided with a central hub, with a raw ring arranged around the central hub and with a series of spokes, which are radially arranged and connect the raw ring to the central hub; subsequently, the temporary rim is subjected to a flow-forming process, which deforms the raw ring determining an axial lengthening thereof, which transforms the raw ring into a channel having the desired final shape.

6 Claims, 2 Drawing Sheets

US 11,759,844 B2

METHOD AND PLANT FOR THE PRODUCTION OF A RIM FOR A WHEEL OF A VEHICLE

CROSS-REFERENCE TO RELATED APPLICATIONS

This patent application claims priority from Italian patent application no. 102021000015200 filed on Jun. 10, 2021, the entire disclosure of which is incorporated herein by reference.

TECHNICAL FIELD

The invention relates to a method and a plant for the production of a rim for a wheel of a vehicle.

BACKGROUND ART

The rim is the element of the wheel connecting the tyre to the vehicle. A rim is supposed to be as light as possible, for the rim is part of the unsprung mass and, when the total unsprung mass increases, the inertia of the suspensions increases as well, thus forcing the suspensions to handle greater weights, which makes them become less reactive, hence increasing the difficulties in preserving an ideal grip. Furthermore, when the mass of the rim increases, the rotational inertia increases (thus increasing the resistance of the wheel to changing its direction) with effects on the steering promptness and there also is an increase in the resistance of the wheel to changing its rotary acceleration both while braking and while accelerating with effects on the braking and accelerating promptness.

Traditionally, in order to lighten the rim, the rim is manufactured with a light alloy (an aluminium-based alloy or a magnesium-based alloy, which is more expensive and lighter) using casting or forging. The use of a flow-forming process was recently suggested, which entails progressively deforming the channel of the rim around a mandrel with a cylindrical symmetry and leads to the production of a rim that is lighter and more resistant than traditional rims available in the market.

An example of the production of a rim by means of a flow-forming process is disclosed in patent U.S. Ser. No. 10/882,104B2.

In order to lighten the rim, the entire rim can also be manufactured by means of an additive manufacturing process, which, however, is particularly time-consuming (and, hence, expensive due to the high hourly costs of 3D printers) because of the large size of the rim. Furthermore, in a rim manufactured by means of an additive manufacturing process, the channel has mechanical features that are not ideal; finally, due to the inherent features of the additive manufacturing process, it can be extremely hard (if not impossible) to avoid ovalizations and possible unbalances of the rim, which further reduce the overall quality of the rim.

Some examples of the production of a rim by means of an additive manufacturing process are disclosed in patent applications WO2019238278A1, DE102016005646A1 and WO2017191497A1.

DESCRIPTION OF THE INVENTION

The object of the invention is to provide a method and a plant for the production of a rim for a wheel of a vehicle, which allow for the production of a lighter rim with the same performances (namely, which lighten the rim without jeopardizing performances).

According to the invention, there are provided a method and a plant for the production of a rim for a wheel of a vehicle according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
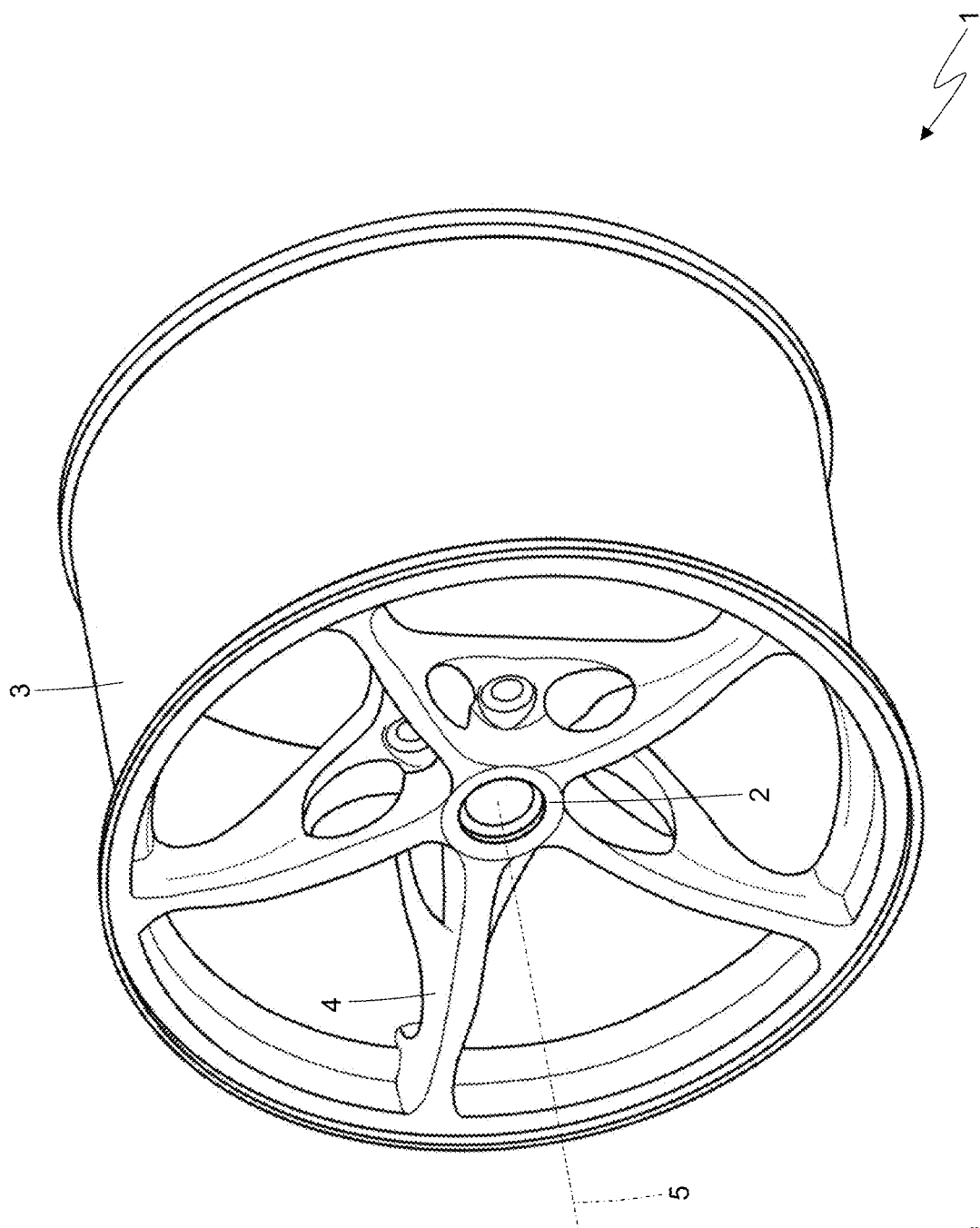
FIG. 1 is a perspective view of a rim according to the invention.

In FIG. 1, reference number 1 indicates, as a whole, a rim for a wheel of a vehicle; namely, the rim 1 is suited to receive a corresponding tyre and is the element of the wheel connecting the tyre to the vehicle.

The rim 1 comprises a central hub 2, which is fixed to a suspension of the vehicle, a properly shaped channel 3, on which the tyre is directly fitted, and a series of five spokes 4, which are radially arranged and connect the channel 3 to the central hub 2. The rim 1 has a central symmetry axis 5, around which the rim 1 rotates in use.

Figure 2:
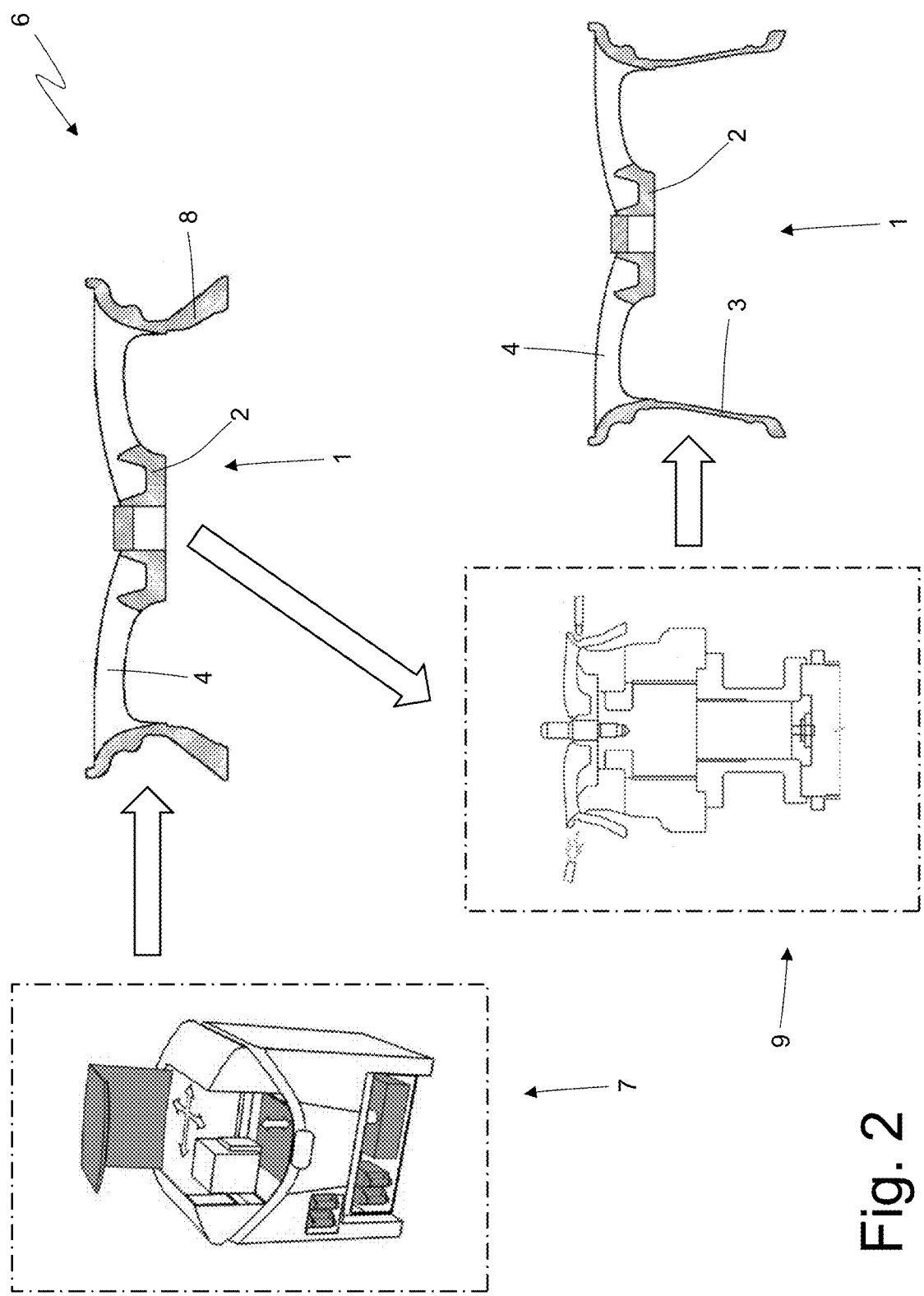
FIG. 2 is a schematic view of a plant for the production of the rim of FIG. 1.

In FIG. 2, reference number 6 indicates, as a whole, a production plant where the rim 1 is manufactured.

The production plant 6 comprises an operating machine 7 configured to manufacture a temporary rim 1 (namely, having a temporary shape different from the final shape) provided with: the central hub 2 (already having the final shape), a raw ring 8 (having a temporary shape, which subsequently has to be changed) arranged around the central hub 2 and the series of spokes 4 (already having the final shape), which are radially arranged and connect the raw ring 8 to the central hub 2. In other words, the temporary rim 1 has the central hub 2 and the spokes 4 already in the final shape and has the raw ring 8, which further needs to be processed in order to gain the finals shape and, hence, become the channel 3.

The operating machine 7 is configured to manufacture the raw rim 1 by means of an additive manufacturing process (which adds layer upon layer, namely operates according to successive layers), namely the operating machine 9 comprises a 3D printer configured to actuate the additive manufacturing process.

The production plant 6 comprises a second operating machine 9, which is configured to subject the temporary rim 1 to a flow-forming process, which deforms the raw ring 8 determining an axial lengthening thereof, which transforms the raw ring 8 into the channel 3 having the final shape (namely, the desired final shape).

At the end of the flow-forming process, the rim 1 is preferably subjected to a thermal treatment, which improves mechanical features. In particular, the production plant 6 comprises an oven (not shown), where the rim 1, which was subjected to the flow-forming process, is heated at a temperature of at least 500° C. for at least 30 minutes; furthermore, the production plant 6 comprises a water quenching tank, where the hot rim 1 coming out of the oven is immersed in order to be quenched in water.

According to a preferred embodiment, the raw ring 8 has a solid structure without inner cavities. According to a preferred embodiment, each spoke 4 has (at least) a net-like structure arranged in an intermediate area between the central hub 2 and the raw ring 8 (namely, between the central hub 2 and the channel 3, after the raw ring 8 has been transformed into the channel 3); preferably (though not necessarily), each net-like structure is on the inside as much as possible (namely, it is not substantially visible from the outside), since it is covered, as much as possible, by a continuous skin, which substantially hides the entire net-like structure (in fact, a net-like structure cannot completely be covered, for non-melted printing powders would be trapped inside the spokes 4 and, therefore, holes have to be provided in order to let out said non-melted powders).

According to a preferred embodiment, the raw rim 1 is made of an aluminium alloy (namely, a light alloy containing aluminium), in particular the AlSi10 aluminium alloy. Alternatively to an aluminium alloy (namely, an alloy containing aluminium), other metal materials, such as steel, magnesium or titanium (typically, in an alloy), can be used.

The embodiments described herein can be combined with one another, without for this reason going beyond the scope of protection of the invention.

The production method described above has different advantages.

First of all, the production method described above produces a rim 1, which, at the same time, is very light (lighter than an equivalent known rim manufactured by means of flow-forming staring from a cast or forged temporary rim 1) and highly performing (more performing than an equivalent known rim manufactured by means of flow-forming staring from a cast or forged temporary rim 1

Furthermore, the method described above has relatively small overall costs (namely, costs that are not much higher than the overall cost to be borne when manufacturing the temporary rim 1 by means of casting or forging)

Finally, the production method described above enables an extreme freedom of customization of the spokes 4 and of the central hub 2, not only in the inner structure (mainly having structural features), but also in the look of the exposed outer surface (mainly having aesthetic features).

These results are obtained thanks to the fact of benefiting from the best of the two technologies used (flow-forming and additive manufacturing) without the disadvantages of the technologies. In particular, additive manufacturing allows the central hub 2 and the spokes 4 to be manufactured with extremely complex designs (even net-like ones), which optimize performances and weights, but it is not used to manufacture the final channel 3 (which would not have ideal performances, if it were manufactured by means of additive manufacturing); the final channel 3, on the other hand, is manufactured through flow-forming starting from the raw ring 8 and, hence, it also has ideal performances and weights.

In other words, the rim 1 manufactured by means of the production method described above preserves the weight advantages offered by additive manufacturing compared to more conventional casting and forging, though maintaining the mechanical features of traditional channels thanks to the use of flow-forming. The spokes 4 produced by means of additive manufacturing can include net-like structures and contain sections that could not be manufactured with conventional technologies. The combination of the two technologies (flow-forming and additive manufacturing) further solves the problems that would arise by entirely manufacturing a rim 1 through additive manufacturing: the channel 3 would have worse mechanical features and, as a consequence, a greater thickness would have to be used; furthermore, because of the inherent features of the technologies, it would be extremely hard, if not impossible, to avoid ovalizations and possible unbalances.

It should be pointed out that the temporary rim 1 manufactured by means of additive manufacturing is very compact, since the axial extension of the raw ring 8 is limited (namely, much more limited than the axial extension of the channel 3 of the final rim 1); thanks to this compactness of the temporary rim 1, the production of the temporary rim 1 through additive manufacturing is relatively quick (namely, much quicker than the production, by means of additive manufacturing, of an equivalent final rim 1) and, hence, relatively cheap (also taking into account the high hourly costs of 3D printers).

LIST OF THE REFERENCE NUMBERS OF THE FIGURES

1 rim
2 central hub
3 channel
4 spokes
5 central axis
6 production plant
7 operating machine
8 raw ring
9 operating machine

The invention claimed is:

1. A method for the production of a rim for a wheel of a vehicle comprising:
   additively manufacturing a temporary rim provided with a central hub, with a raw ring arranged around the central hub and with a series of spokes radially arranged to connect the raw ring to the central hub, wherein the raw ring is a temporary shape and the central hub and the series of spokes are in a final shape; and
   subjecting the temporary rim to a flow-forming process, which deforms only the raw ring, which transforms the raw ring from the temporary shape into a channel having a desired final shape, wherein the desired final shape of the raw ring is axially lengthened and thinned relative to the temporary shape of the raw ring, wherein dimensions of the central hub and the series of spokes remain unchanged during the flow-forming process, wherein each one in the series of spokes has at least one lattice structure arranged in an intermediate area between the central hub and the raw ring, and wherein each lattice structure is on an inside and is covered by a continuous skin.

2. The production method according to claim 1, wherein the additively manufacturing comprises building the temporary rim layer upon layer.

3. The production method according to claim 1, wherein the raw ring has a solid structure without inner cavities.

4. The production method according to claim 1, wherein the raw rim is made of an aluminium alloy.

5. The production method according to claim 1 and comprising the further step of subjecting the rim to a thermal treatment after the flow-forming process.

6. The production method according to claim 5, wherein the thermal treatment entails heating the rim at a temperature of at least 500° C. for at least 30 minutes and then quenching the rim in water.

* * * * *